INVENTOR.
Werner G. Hess.

Nov. 15, 1955 W. G. HESS 2,724,036
OVERLAPPED JOINT WELDING DEVICE
Filed June 2, 1951 5 Sheets-Sheet 3
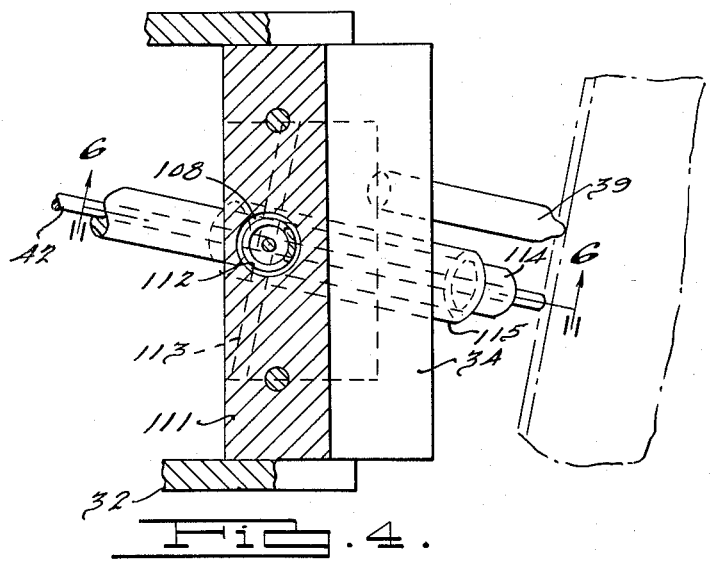
Fig. 4.
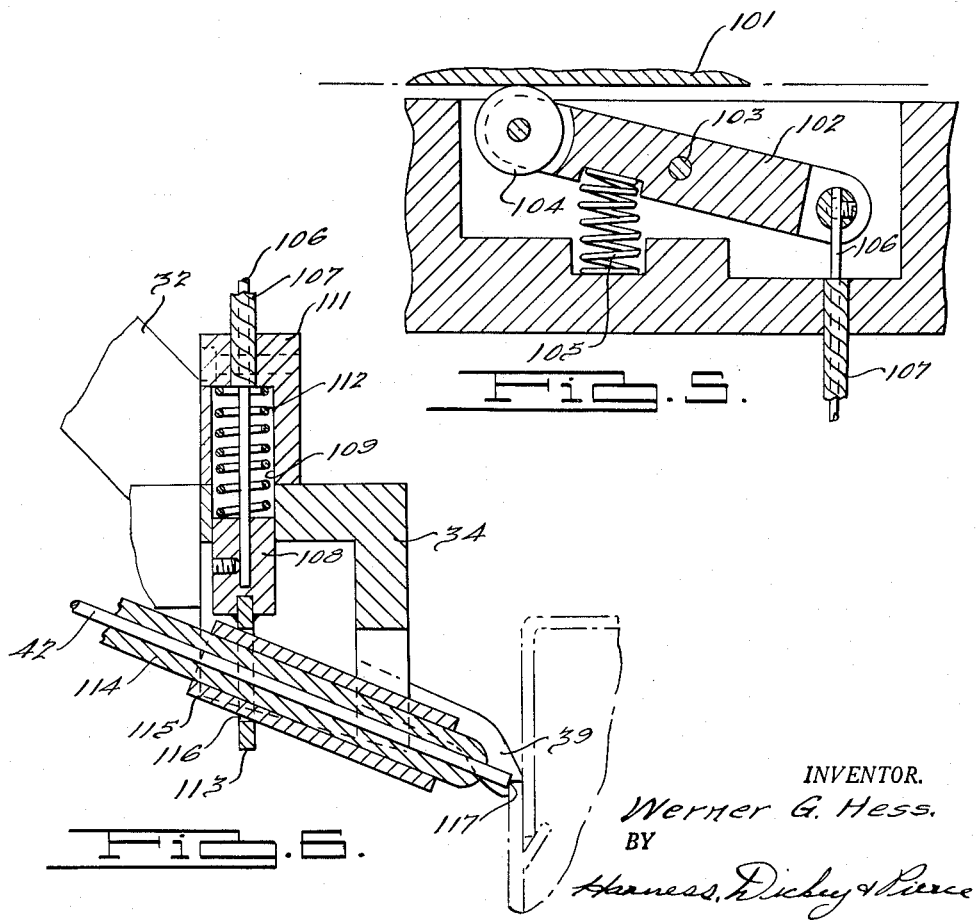
Fig. 5.
Fig. 6.
INVENTOR.
Werner G. Hess.
BY
Harness, Dickey & Pierce
ATTORNEYS.

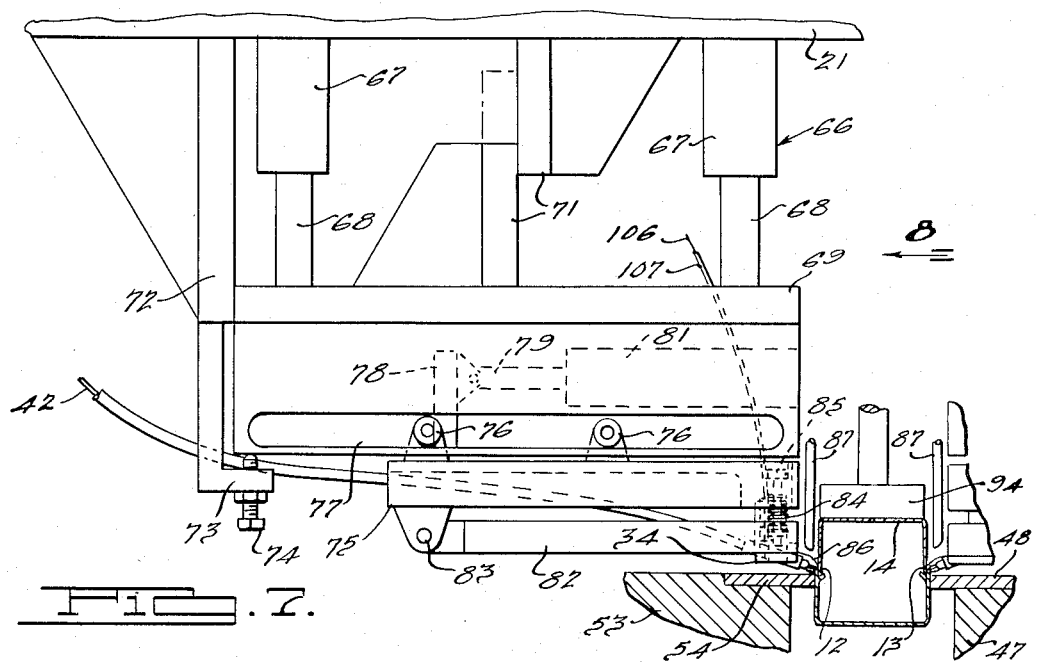
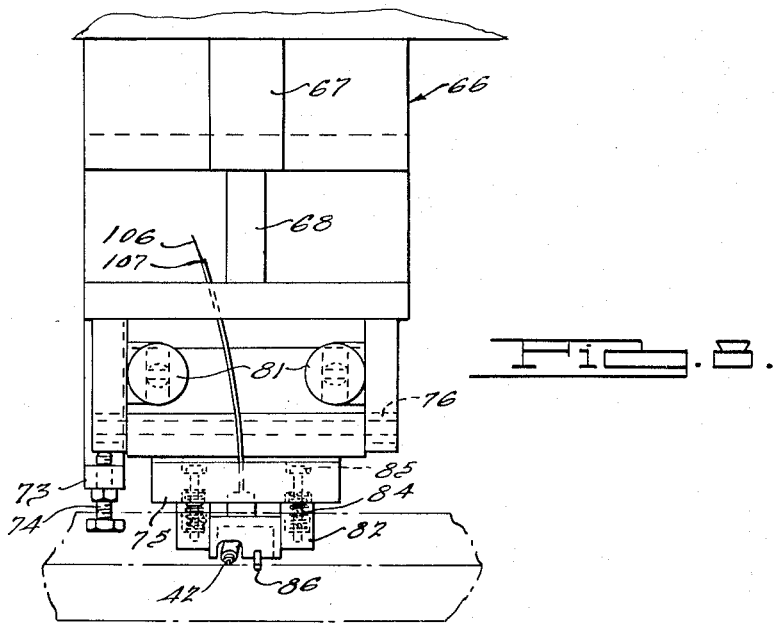

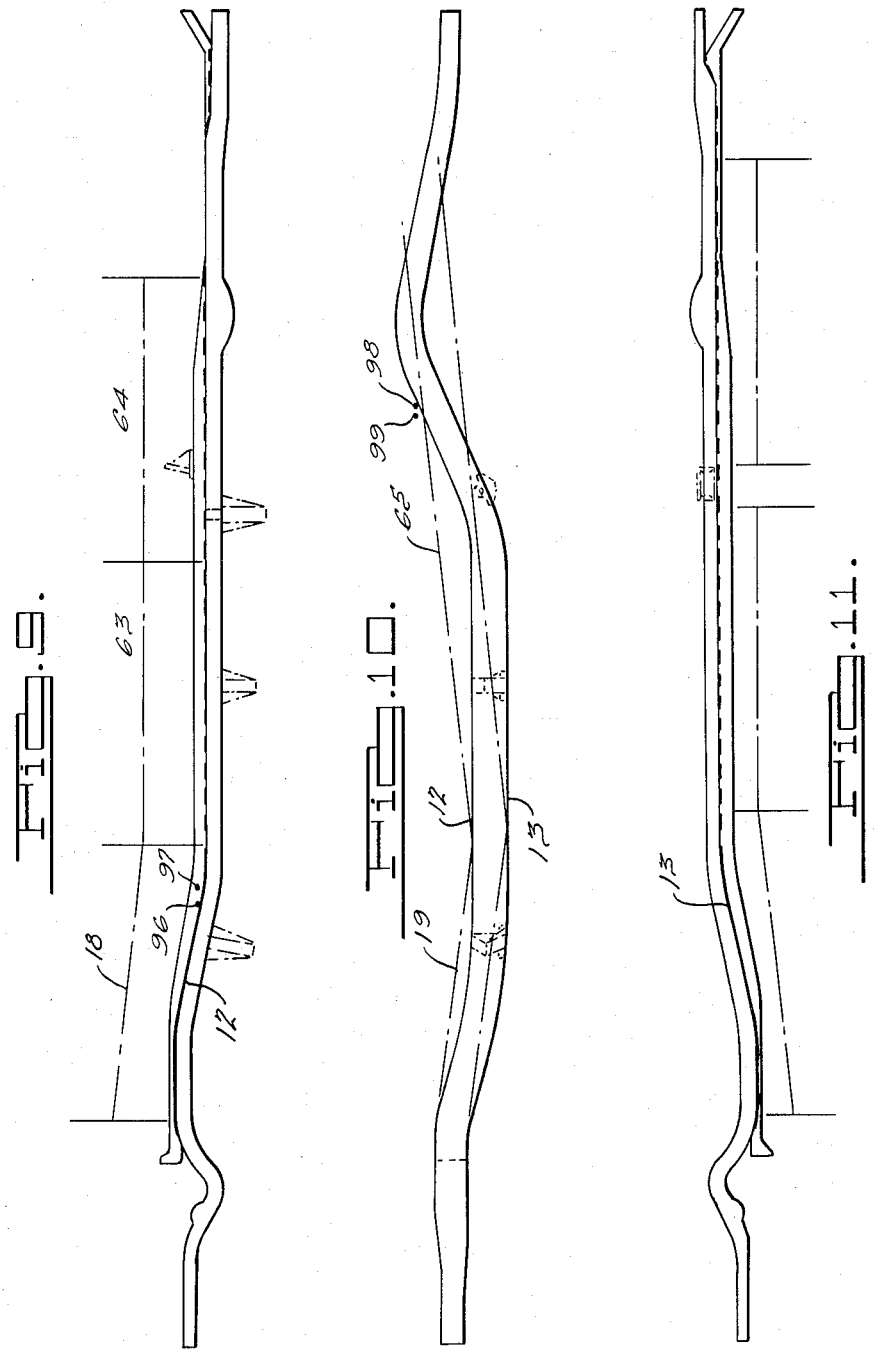

United States Patent Office 2,724,036
Patented Nov. 15, 1955

2,724,036

OVERLAPPED JOINT WELDING DEVICE

Werner George Hess, Dearborn, Mich., assignor, by mesne assignments, to Dana Corporation, Toledo, Ohio, a corporation of Virginia Application June 2, 1951, Serial No. 229,634

12 Claims. (Cl. 219—10)

This invention relates to welding apparatus, and particularly to an automatic device for welding undulated joints along which the welding electrode may be accurately guided, and is a continuation-in-part of the copending application of Werner G. Hess, Serial No. 204,864, filed January 8, 1951, and assigned to the assignee of the present invention.

While the welding apparatus of the above mentioned application has proved satisfactory for welding undulated joints which vary from both the horizontal and the vertical plane, it was found that where the workpiece has joints which vary substantially from a straight line only in a single plane, a second type of support for the welding head may be utilized.

The present invention pertains to the use of the support for the welding heads as disclosed in the mentioned application, and also a second type of support, a plurality of which are independently mounted on a machine to be simultaneously operated for welding a workpiece of substantial length, such as a rail of a chassis frame having joints which substantially vary from a horizontal and vertical plane, at least in certain parts thereof. When the joint varies substantially in the horizontal plane and very little variation occurs in the vertical plane, a type of support for the welding head is provided which permits a substantial variation in movement in a horizontal plane and a movement in a vertical plane to a substantially lesser degree. This simplifies the construction over that employed in the machine disclosed in the above mentioned patent application.

It was found that the necessity for spacing the guiding finger from the end of the welding rod to keep it from being damaged by the arc produced a change in position of the welding rod relative to the joint as the joint varied in contour so that the end of the welding rod did not at all times accurately follow the joint. A cam plate was provided along the length of the machine, having cam surfaces at points where the variation of position of the rod relative to the finger and joint occurred which varied the position of the end of the welding rod so that it at all times accurately followed the joint to be welded.

The longitudinal rail for which the present machine was invented has the left-hand end portion, as viewed in the figures, provided with joints which vary substantially both in a horizontal and a vertical direction. For this length of the rail a device is employed similar to that disclosed in the above mentioned application. At two other sections of the rail of substantially the same length, where substantial variation occurs only in the horizontal plane, a new type of supporting device is employed. The device is employed in pairs so that six of the devices are utilized for welding one of the rails. Each of the devices is self-contained and independently driven but interconnected in a control circuit so that all six of the devices operate simultaneously and complete the welding at both sides of the chassis frame throughout the length to be welded during the time required for any one of the welding devices to weld its particular section. It is contemplated that each of the devices is capable of welding at the rate of from 125 to 150 inches per minute and with three pairs of the devices operating simultaneously on less than 100 inches of weld, it is readily apparent that the welding of the chasis frame occurs in less than one-third of a minute.

Accordingly, the main objects of the invention are: to provide a device for supporting a welding head which accurately guides the welding wire along an undulated joint to be welded; to provide a machine for welding an undulated joint which varies from a horizontal and vertical plane by utilizing several welding devices simultaneously for welding substantially equal sections of the joint; to provide welding machines in pairs which operate on undulated joints on both sides of a structure to be welded for welding substantially equal lengths thereof simultaneously at both sides of a workpiece; to provide, in a machine for welding undulated joints of elongated workpieces, supporting devices for the welding head which simultaneously pass over different portions of the workpiece, some of which permit a large movement of the welding rod end both in a vertical and horizontal plane, others of which provide a large movement only in a single plane, depending upon the contour of the joint; to provide cam operated mechanism for changing the position of the end of the welding rod relative to the position of the guiding finger to compensate for the misguiding of the rod at certain points in the joint contour; to provide a machine for welding undulated joints on both sides of a structure to be welded along substantially 100″ of welding length in less than one-half minute of time; and, in general, to provide a machine for welding joints which is simple in construction, positive in operation and economical of manufacture.

Other objects and features of novelty of the invention will be specifically pointed out or will become apparent when referring, for a better understanding of the invention, to the following description taken in conjunction with the accompanying drawings, wherein:

Fig. 3 is an enlarged sectional view of the structure illustrated in Fig. 1, taken on the line 3—3 thereof;

Fig. 4 is an enlarged sectional view of the structure illustrated in Fig. 3, taken on the line 4—4 thereof;

Fig. 5 is an enlarged sectional view of the structure illustrated in Fig. 3, taken on the line 5—5 thereof;

Fig. 6 is an enlarged sectional view of the structure illustrated in Fig. 4, taken on the line 6—6 thereof;

Fig. 7 is an enlarged sectional view of the machine illustrated in Fig. 1, taken on the line 7—7 thereof;

Fig. 8 is an end view of the structure illustrated in Fig. 7, as viewed from point 8 thereof;

Fig. 9 is a view in elevation of a chassis rail of box-section structure, having joints to be welded in the machine of Fig. 1;

Fig. 10 is a plan view of the structure illustrated in Fig. 9, and

Fig. 11 is a view of the opposite side of the chassis frame element from that illustrated in Fig. 9.

Figure 1:
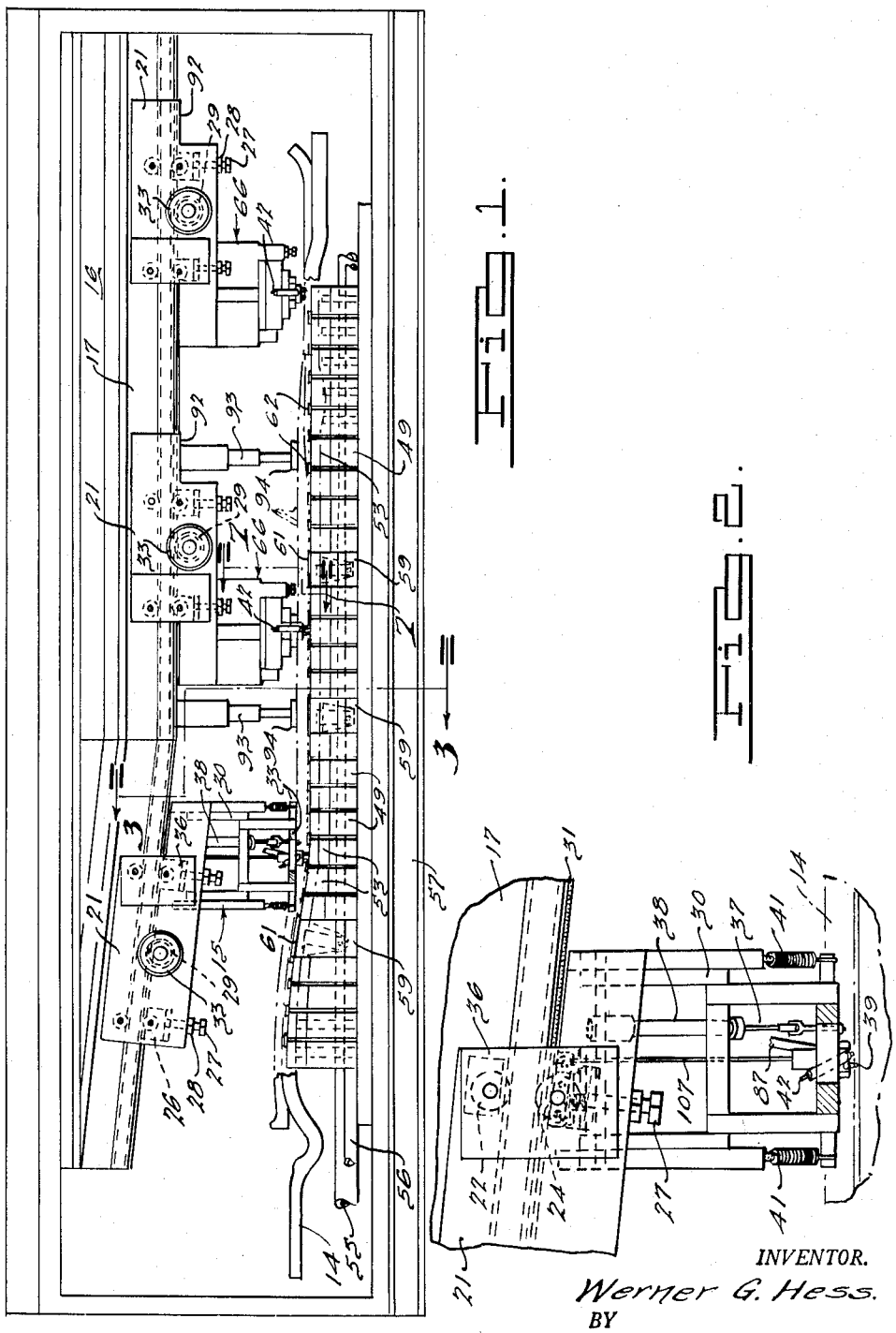
Figure 1 is a sectional view in elevation of a machine for welding undulated joints embodying features of the present invention.
Figure 2:
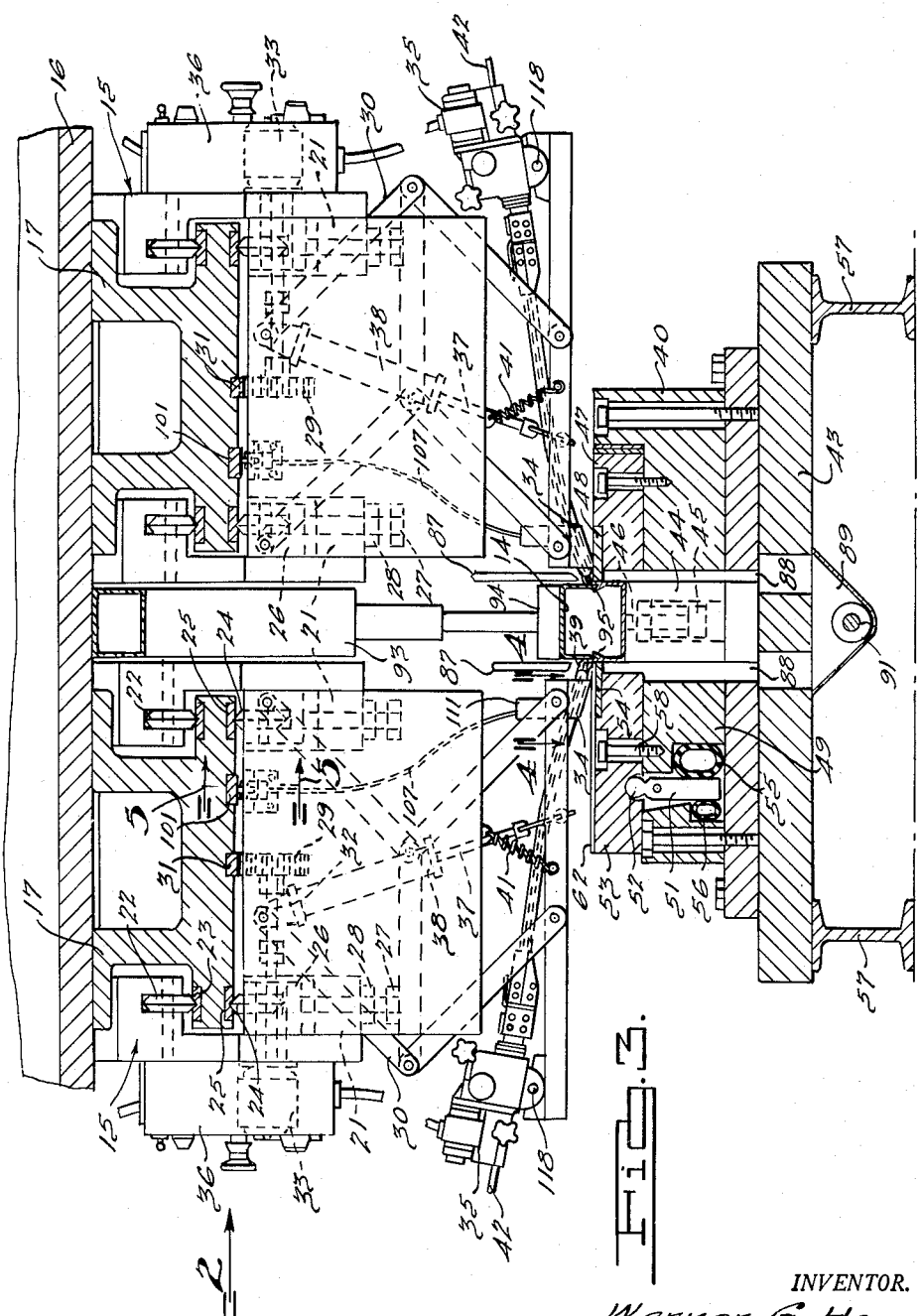
Fig. 2 is an enlarged view of a portion of the machine illustrated in Fig. 1, as viewed from point 2 of Fig. 3.

Referring to the figures, a machine 10 is illustrated for welding undulated joints 12 and 13 at opposite sides of a box-section chassis frame side rail 14. While a side rail for a chassis frame is illustrated as being the workpiece which is to be welded in the present machine, this is shown by way of example rather than limitation, and it is to be understood that the machine of the present invention is capable of welding various types of workpieces so long as a guiding finger can be employed at the weld for guiding the welding rod therealong. It is to be understood also that while a plurality of welding units are illustrated in the one machine of two different types, that either type of welding unit as illustrated or modified could be used for welding a workpiece. In Fig. 1 it will be noted that a welding unit 15 is employed on the left-hand end of the machine for welding the left-hand portion of the rearward joint of the workpiece. As illustrated more specifically in Fig. 3, oppositely disposed welding units 15 are utilized for operating on joints on opposite sides of the chassis frame rail 14. Each unit operates in a similar manner as the unit illustrated and described in the above mentioned application.

In the present arrangement, a header 16 of the machine supports a pair of rail elements 17 which slope downwardly and inwardly for the length of travel of the units 15. This downward travel is illustrated by the line 18 of Fig. 9 and the inward travel is illustrated by the line 19 of Fig. 10. A pair of carriages 21 is provided on the units 15 having conical rollers 22 at the top which operate in grooved rail elements 23 in the track. A similar pair of rollers 24 engages the groove in the inverted rail elements 25 of the track and these are mounted for adjustment toward the track in a slide 26 which is adjusted by a bolt 27 that is locked in position by a nut 28. The carriage is driven by a gear 29 engaging the teeth of a rack 31 in the track 17. The gear is supported on a shaft 32 and is driven by a motor 33 which is supported on the carriage 21. The double parallel link assembly 30 is secured on the carriage in a manner to have the lower set of links support the welding head 34 as well as the motor 35 for feeding the welding rod from the head. A control mechanism 36 is supported by the carriage for controlling the operation of the motor 35, as explained in the above mentioned application. The link assembly 30 is retracted by a piston rod 37 operating in the cylinder 38 for moving the welding rod upwardly and outwardly from the work. When the piston rod is extended, the link assembly swings the guide finger 39 of the device downwardly and toward the workpiece with which it engages and which then moves downwardly to engage the flange of the assembled workpiece elements at the joint to be welded. Springs 41 counterbalance the weight of the motor and welding mechanism on the link assembly.

As the joint to be welded follows a path which shifts to the right or left, or upwardly or downwardly, the finger shifts to maintain its engagement with the flange of the joint and thereby is capable of guiding the welding rod 42 along the joint. The workpiece 14 is supported on a bed 43 when resting on a central cradle 44 which may be provided with one or more pistons 45 for operating a rod 46 and raising the workpiece from the cradle after the welding operation has been completed. On the right-hand side of the element 44, a shiftable block 40 is provided having a further adjustable block 47 thereon which carries a flux-retaining platform 48 in engagement with one side of the chassis rail element. A similar adjustable block 49 is provided on the opposite side of the cradle 44, having an operating link 51 pivoted therein which has a round head 52 projecting into an opening in a slide 53. The slide 53 carries a flux-supporting plate 54 which engages the opposite side of the workpiece from the plate 48 and produces a lateral clamping action on the workpieces when the slide 53 is advanced theretoward. This advancement is produced by a pressure of air delivered within a flexible tube 55. The pressure of air delivered within a smaller flexible tube 56 on the opposite side of the link 51 produces the retraction of the slide 53 when the tube 55 is deflected. The larger diameter tube produces a greater pressure for performing the clamping operation.

The bed 43 may be supported in any suitable manner, and is herein illustrated as being supported on a pair of rails 57. The slide 53 is retained upon the block 49 by a plurality of bolts 58 which extend through slots in the slide and permit the forward and reverse movement thereof on the block. As will be seen in Fig. 1, a plurality of the blocks 49 and slides 53 are utilized throughout the length of the element to be welded, and such blocks and slides are omitted at the points 59 at which brackets or other protuberances prevent the use of blocks. However, each of the spaces 59 is spanned by a plate 61 which is welded to an adjacent slide 53 so that these spaces are spanned by a plate for supporting the flux at the joint which extends across the spaces. Similarly, additional plates 62 are carried by each of the blocks 53 spanning the flux-supporting platform 54 so as to cover the gap between the platforms 54 of adjacent blocks for preventing the flux from passing downwardly between the platform sections.

The tracks 17, at the sections of the workpiece indicated as 63 and 64 in Fig. 9, are disposed in the vertical plane but slope outwardly along the line 65 of Fig. 10 in the horizontal plane. The sections are disposed medially of the bend in the chassis frame element so as to minimize the forward and backward movement of the welding device. At the sections 63 and 64, welding units 66 are utilized because of the fact that the major movement of these devices is in a horizontal plane and very little movement is required of the welding rod in a vertical plane.

This unit is illustrated more specifically in Figs. 7 and 8 wherein the carriage 21 of the unit 66 supports a pair of cylinders 67 from which rods 68 project. The rods 68 are attached to a carriage 69 which is guided for vertical movement by plates 71 and also by the rearwardly disposed plate 72. The plate 72 is extended downwardly and provided with an extension 73 containing a bolt 74 which limits the downward travel of the carriage 69. The carriage 69 supports a carriage 75 which is mounted on rollers 76 engaging slots 77 at the bottom of the carriage 68. The carriage 75 has an upwardly projecting plate 78 pivotally attached to a pair of rods 79 operating from a pair of cylinders 81 by which the carriage 75 is moved forwardly or rearwardly. The carriage 75 supports a bar 82 on a pivot 83, the opposite end of the bar being urged downwardly from the carriage 75 by a spring 84 secured about a bolt 85. The carriage 21 supports a driving motor 33 for operating the gear 29 along a rack 31 of the track 17, and the control mechanism feeding the welding rod 42 is also supported on the carriage. The motor 35 for feeding the rod, however, in this arrangement is supported on the header 16 of the machine or on some other support adjacent thereto or thereabove, as illustrated in the above mentioned copending application. In this arrangement, the air supply delivered to the cylinders 67 and 81 is controlled from solenoid valves which energize the cylinders in sequence to first move the carriage 69 downwardly and thereafter move the carriage 75 toward the workpiece so that the guide finger 86 first engages the side of the workpiece, and as the downward movement continues until the carriage 69 engages the stop 74, the finger 86 will rest upon the flange adjacent to the undulated joint to be welded. During this downward movement the spring 84 is compressed a sufficient amount to permit the finger 86 to move upwardly and downwardly an amount required to take care of vertical variations in the position of the joint while traversing the length of the joint during the welding operation.

In all of the devices tubes 87 are provided for delivering flux to the joint in the vicinity of the guiding finger so that the joint and arc at the weld will be entirely submerged by the flux. The flux may fall downwardly from the platforms 48 and 54 through the space 88 into a trough 89 in which a worm screw 91 is rotated for reclaiming the flux. It is to be understood, therefore, that a pair of the units 15 is employed for welding the section of the rail indicated at 18 and 19 in Figs. 9 and 10, and that two pairs of units 66 are employed at the sections 63, 64 and 65 of Figs. 9 and 10. It is also to be understood that each of the six units 15 and 66 is independently driven but that all six units are preferably operated simultaneously.

It will be noted in Fig. 1 that the carriages 21 support the units 15 and 66 in such manner as to permit the welding of the entire length of the sections without interference. Thus, the units 15 overhang the carriage 21 on the right, while the units 66 overhang their respective carriages on the left, and the carriages 21 for the units 66 have a cutout portion 92 which overlaps the projecting portion of the units. A pair of clamping cylinders 93 is supported between the rails 17, having clamping blocks 94 on the end thereof for applying a downward force to the assembled elements of the chassis frame rail. Stop elements 95 are provided on the assembly which limit the nesting of one of the rail elements within the other. The sideward force applied by the slides 53 forces the two overlapped flanges of the assembly into intimate engagement with each other throughout the length of the rail so that they are in tight engagement at the time of being welded and satisfactory welds will always be produced.

Referring more specifically to Fig. 9, attention is drawn to the fact that when the finger 39 or 86 traveling along the rail is at the point 96, the welding electrode will be at the point 97 since the point and finger are substantially in a horizontal plane. The electrode will not follow the joint as the finger moves upwardly and a satisfactory weld will not result. This same result occurs when the finger follows a joint which moves outwardly from a horizontal plane, as illustrated in Fig. 10. In this instance, the finger will be at the point 98 and the welding rod, which should be at the point 99, must move inwardly to engage the joint. As the welding rod is disposed at an angle of substantially 25°, as illustrated in Fig. 3, its inward movement will lower the end to a position below the top of the flange of the joint and a good weld will not be produced. To overcome this difficulty, a cam rail 101 is mounted in the track for each of the devices. Each cam rail has cam surfaces thereon which produce the raising and lowering of the welding rod end when there is any tendency for the welding rod end to move from a desired position in contact with the outer top edge of the overlapped flange, due to the contour change of the flange and the movement of the finger thereover. At points where such discrepancy has occurred, a cam surface has been provided on the cam rail 101, and suitable mechanism, now to be described, is provided for changing the position of the end of the welding rod relative to the finger.

Referring more particularly to Figs. 2 to 7, it will be noted that the cam rail 101 runs throughout the length of the track 17 and that each of the units 15 and 66 has a link 102 secured by a pivot 103 thereto, one end of the link having a roller 104 disposed in engagement with the cam surface. A spring 105 urges the link in a clockwise direction to maintain the roller 104 in engagement with the cam surface. The opposite end of the link 102 has a Bowden wire 106 secured thereto, the oposite end being attached to a cylindrical boss 108 which operates in a cylindrical opening 109 in the welding head 34 at the forward end of the welding unit. The wire is encased in a flexible tubular element 107 secured at one end to the projecting boss 111 and at the opposite end to the unit 15 or 66 as the case may be. A spring 112 within the cylindrical opening 109 biases the boss 108 downwardly along with a plate 113 which is welded or otherwise secured to the lower end of the boss 108 in a manner to be disposed normal to the vertical plane through the welding rod 42. In Fig. 4 it will be noted that the welding rod 42 in plan view is disposed at an angle through the head 34 and that the finger 39 is retained parallel to the rod. This arangement is employed when the joint to be welded is disposed at an angle to the head 34 permitting the rod and finger to be substantially normal to the joint. It will be noted that the plate 113 is also mounted at an angle to the head 34 substantially parallel to the joint and a line through the tip of the rod and finger.

The tubular portion 114 of the welding rod holder has a tubular element 115 thereon which passes through an opening 116 in the plate 113 so that as the plug 108 is raised or lowered, the tube 115 is raised and lowered therewith, thereby raising or lowering the end of the welding rod 42 to maintain its engagement with the corner 117 of the flange of the workpiece when a change in the contour of the joint would otherwise cause the guide finger 39 to shift the end of the rod therefrom.

It will be noted in Fig. 7 that the bar 82 which supports the welding head 34 is pivoted at 83 so that the wire 106 can raise and lower the opposite end of the bar 82. It will also be noted in Fig. 3 that the motor is supported on the link 30 by a pivot 118 so that the opposite end of the welding rod supporting tube 114 is free to be raised and lowered by the wire 106. The cam surface of the rail 101 produces an up and down movement to the end of the welding rod 42 relative to the end of the guide finger 39 at points along the joint to be welded in both of the devices 15 and 66. With this arrangement the end of the welding rod 42 is at all times maintained exactly located relative to the joint to be welded.

When a workpiece such as the rail 14 is to be welded, the devices 15 and 66 are in retracted position and the rail is set in the machine upon the support 44 against the flux platform 48. Air is introduced into the tube 55 which expands to operate the link 51 and the slide 53 and move the platforms 54 against the opposite side of the workpiece to the platform 48, thereby laterally clamping the workpiece in position. The cylinder 93 lowers the clamping plates 94 into engagement with the top of the workpiece to force the two telescoped elements thereof downwardly into intimate and accurate engagement with each other. Thereafter, the lowering cylinders 38 and 67 of the devices 15 and 66 are actuated and the cylinders 81 of the devices 66 are also actuated to cause the fingers 39 and 86 of the two devices to move first into engagement with the side of the workpiece and thereafter downwardly into engagement with the top of the flanges at the sides of the joints to be welded. Flux is provided from the delivering tubes 87 to the platforms 48 and 54 over the welding rod ends and the joints. The welding current is turned on at the time the driving motors 33 for the carriages are energized, to move the devices along the tracks 17 as the welding operation continues. During the travel of the devices, the ends of the welding rod are moved upwardly and downwardly relative to the associated guiding fingers to compensate for the misguiding of the ends which occurs due to certain changes in the contour of the joint being welded. The joints along opposite sides of the three sections of the workpiece, indicated by numerals 18, 63 and 64 in Fig. 9, are simultaneously welded during the simultaneous operation of the six devices. While six devices are illustrated in the present machine, it is to be understood that one or any number of either of the devices may be employed for welding an undulated joint, depending upon the type of workpiece and welds which are to be produced.

What is claimed is:

1. The method of welding a joint which follows an undulated path along related surfaces which includes the steps of, maintaining a guiding finger at the junction of the related surfaces, feeding a welding rod supported adjacent to the guiding finger toward the joint in a direction substantially normal to the joint, relatively moving said finger and joint lengthwise of the joint to perform a welding operation, and adjusting the welding rod relative to the guiding finger substantially normal to its direction of movement longitudinally of the joint at points of change in said path as the welding operation proceeds.

2. The method of welding an undulated joint of a workpiece which varies in both the horizontal and vertical planes which includes the steps, of urging a guide finger horizontally and vertically into engagement with the joint to be in position to follow the joint in all of its changing positions throughout the length thereof as the guide finger is moved therealong, feeding a welding rod located relative to the guide finger substantially horizontally toward the joint to engage the joint at a predetermined point spaced from the guide finger, and maintaining said position of the welding rod with the joint by adjusting the welding rod vertically relative to the position of the guide finger as the path of the joint changes.

3. In a welding device having a base support, means for clamping a workpiece on the support, a track supported by and secured above the support, a welding device supported by and movable along said track, a guide finger, means on said welding device for supporting and urging the finger toward the work and against the joint at all times so as to follow the joint as its position changes in both horizontal and vertical planes in all of its positions as the welding device is moved therealong, means for supporting a welding rod adjacent to the finger in position to contact the joint at a predetermined point, means for feeding the rod toward the joint, and means for maintaining the relationship of the end of the rod with the joint in all of the undulated positions thereof by moving the end relative to the guide finger at points of change in position of the joint in said planes.

4. In a welding device having a base support, means for clamping a workpiece on the support, a track supported by and secured above the support, a welding device supported by and movable along said track, a guide finger, means on said welding device for supporting and urging the finger toward the work and against the joint at all times so as to follow the joint as it changes its position in the horizontal and vertical planes relative to the welding device as the latter is moved therealong, means for supporting a welding rod adjacent to the finger in position to contact the joint at a predetermined point spaced from the finger, means for feeding the rod toward the joint, means for maintaining the relationship of the end of the rod with the joint as it changes its position in the planes by moving the end relative to the guide finger at points of change of position of the joint, said last means embodying a cam track, a cam track follower, and operating means connecting the follower to the rod end.

5. In a welding machine, a track, a carriage supported on said track, means for driving said carriage along said track, a vertically movable platform on said carriage, means for raising and lowering said platform, a horizontally movable table carried by said platform, means for horizontally moving said table, a guide finger projecting from said table for engaging and following a joint to be welded which may vary its position inwardly, outwardly, upwardly or downwardly relative to the carriage, a welding rod supporting element secured to said table adjacent to said guide finger, means for raising and lowering said supporting element relative to said finger for directing said element toward the joint as the joint changes position relative to the carriage, said raising and lowering means comprising a cam track, a cam follower, and connecting means between said cam follower and said supporting element.

6. In a welding machine, track means, a carriage movable on said track means, a guide finger, means on said carriage supporting said guide finger in a manner to follow an undulated joint to be welded which changes position relative to said carriage in both the horizontal and vertical planes, a welding rod supporting element carried by said means, and means for moving said supporting element relative to said finger while said finger engages said joint.

7. In a welding machine, track means, a carriage movable on said track means, a guide finger, means on said carriage supporting said guide finger in a manner to follow an undulated joint to be welded which changes position relative to said carriage in both the horizontal and vertical planes, a welding rod supporting element carried by said means, means for moving said supporting element relative to said finger while said finger engages said joint, said last means embodying a cam track, a cam track follower, and means for joining the follower to said element.

8. In a welding machine, a base, means for clamping a workpiece on said base, said clamping means embodying overlapping platform portions for supporting flux delivered thereon, a track supported by said base, a carriage on said track, a guide finger, means on said carriage for supporting said guide finger in a manner to follow an undulated joint which changes position in both the horizontal and vertical planes relative to the carriage as the latter is moved therealong, a welding rod supporting element carried by said means, a cam track on said first track, a cam follower on said carriage, and means interconnecting said element and follower for moving said element relative to said finger at a certain point along said joint when the position thereof changes relative to the carriage.

9. In a welding machine, a base, means for clamping a workpiece on said base, said clamping means embodying overlapping platform portions for supporting flux delivered thereon, a track supported by said base, a carriage on said track, a guide finger, means on said carriage for supporting said guide finger in a manner to follow an undulated joint which changes position in both the horizontal and vertical planes relative to the carriage as the latter is moved therealong, a welding rod supporting element carried by said means, a cam track on said first track, a cam follower on said carriage, means interconnecting said element and follower for moving said element relative to said finger at a certain point along said joint when the position thereof changes relative to the carriage, and inflatable tubes for actuating said clamping means to and from clamping position.

10. In a machine for welding a workpiece joint, points of which are located in different positions in both the horizontal and vertical planes, a track, a carriage supported on said track, means for driving said carriage along said track, a vertically movable platform on said carriage, means for raising and lowering said platform, a horizontally movable table carried by said platform, means for horizontally moving said table, a guide finger projecting from said table in position to engage said joint and move said table and platform in said horizontal and vertical planes when following the undulated path of said joint as said carriage is driven, and a welding rod supporting element secured to said table adjacent to said guide finger for retaining the rod in welding position relative to the joint.

11. The method of welding a joint which follows an undulated path along related surfaces which includes the steps of, guiding a welding rod from the joint to be welded as the welding rod and guide element are moved longitudinally therealong and while the rod is fed relative to the joint, and moving the welding rod transversely of the joint and relative to the guiding element to accurately follow the joint as the point along the joint at which guiding occurs changes its direction before the welding rod reaches the point.

12. The method of welding a joint which follows an undulated path along related surfaces which includes the steps of, positioning a welding rod relative to the joint by a guiding element which engages the joint at a point therealong which is spaced from the arc produced by the welding rod, and changing the position of the welding rod relative to the guiding element as the point at which guiding occurs changes its position inwardly, outwardly, upwardly or downwardly so that the welding rod will remain directed toward the joint as the guiding element changes its position when following another part of the joint which has a different position from the part being welded.

References Cited in the file of this patent

UNITED STATES PATENTS

| | | |
|---|---|---|
| 1,683,762 | D'Ardenne et al. | Sept. 11, 1928 |
| 1,751,077 | D'Ardenne et al. | Mar. 18, 1930 |
| 1,957,489 | Comstock | May 8, 1934 |
| 2,189,399 | Lewbers | Feb. 6, 1940 |
| 2,288,032 | Smith | June 30, 1942 |
| 2,441,748 | Black | May 18, 1948 |
| 2,466,497 | Smith | Apr. 5, 1949 |
| 2,472,803 | Beyer et al. | June 14, 1949 |
| 2,522,146 | Tichenor | Sept. 12, 1950 |